United States Patent
Thankachan et al.

(10) Patent No.: US 6,191,315 B1
(45) Date of Patent: Feb. 20, 2001

(54) HAZE FREE POLYETHER POLYOL COMPOSITIONS AND A METHOD FOR THEIR PREPARATION

(75) Inventors: Chacko Thankachan, West Bloomfield; Brian J. Betke, Southgate; Michael C. Welch, Woodhaven, all of MI (US)

(73) Assignee: BASF Corporation, Mount Olive, NJ (US)

( * ) Notice: Under 35 U.S.C. 154(b), the term of this patent shall be extended for 0 days.

(21) Appl. No.: 09/248,418

(22) Filed: Feb. 11, 1999

(51) Int. Cl.[7] ............................ C07C 41/44; C07C 41/02; C07C 41/34; C07C 41/46; C07C 43/13
(52) U.S. Cl. .................. 568/621; 528/486; 568/583; 568/589; 568/606; 568/613; 568/618; 568/620; 568/622; 568/623; 568/624; 568/625
(58) Field of Search ...................... 528/486; 568/583, 568/589, 606, 613, 618, 620, 621, 622, 623, 624, 625

(56) References Cited

U.S. PATENT DOCUMENTS

| | | | |
|---|---|---|---|
| 3,000,963 | * | 9/1961 | Speranza ............................. 568/621 |
| 3,016,404 | * | 1/1962 | Beauchamp et al. ............... 568/621 |
| 3,299,151 | * | 1/1967 | Wismer et al. ..................... 568/621 |
| 4,110,268 | * | 8/1978 | Longley et al. .................... 521/177 |
| 4,426,301 | | 1/1984 | Dexheimer et al. ................ 252/8.9 |
| 4,430,490 | | 2/1984 | Doerge ................................ 528/77 |
| 4,468,478 | * | 8/1984 | Dexheimer et al. ................ 521/125 |
| 4,497,702 | | 2/1985 | Miller et al. ........................ 208/47 |
| 4,521,548 | | 6/1985 | Christen et al. .................... 521/167 |
| 5,741,436 | | 4/1998 | Gershun et al. ..................... 252/76 |

FOREIGN PATENT DOCUMENTS

WO98/20061    5/1998  (WO).

OTHER PUBLICATIONS

Neo Acids: Synthetic Highly Branched Organic Acids by M. Fefer, J. Am. Oil Chemists' Soc., Apr. 1978, vol. 5, pp. 342A–345A.
Neo Acids by Exxon Chemical, pp. 1–15.

* cited by examiner

*Primary Examiner*—Rabon Sergent
(74) *Attorney, Agent, or Firm*—Mark A. Frentrup

(57) ABSTRACT

Most generally, the invention provides a method for making a neutralized polyether polyol, comprising the steps of a) Polymerizing one or more alkylene oxides in the presence of an alkaline catalyst to form a polyalkylene oxide intermediate; and b) Neutralizing the intermediate, after the polymerization step a) is complete, with an organic acid of general formula

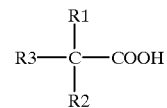

where R1 is hydrogen, methyl, or ethyl; R2 is methyl or ethyl; and R3 is an alkyl, aryl, or aralkyl group containing one to twelve carbon atoms. The invention also comprises the novel compositions made by the above process.

22 Claims, No Drawings

HAZE FREE POLYETHER POLYOL COMPOSITIONS AND A METHOD FOR THEIR PREPARATION

FIELD OF THE INVENTION

The present invention relates to novel haze-free polyether polyol and nonionic surfactant compositions and a method for their preparation by neutralization of the polymerization catalyst using certain branched organic acids.

BACKGROUND OF THE INVENTION

Polyether polyols and nonionic surfactants are prepared by means well known in the art. Generally, they are prepared by the reaction of alkylene oxides with starter molecules that have active hydrogens. The reaction is often catalyzed with alkaline catalysts. At the end of the reaction it is desirable to deactivate the catalyst by either removing or neutralizing it. A common method of catalyst removal is by treatment with magnesium silicate and subsequent filtration. In other cases the alkaline catalyst is neutralized with an inorganic acid to precipitate the salts which are filtered with or without further treatment with magnesium silicate. However, the most cost-effective way of deactivating the catalyst is by neutralizing with an acid and leaving the salt in the nonionic surfactant. The most commonly used catalysts in the preparation of nonionic surfactants are potassium and sodium hydroxides, and the most commonly used neutralizing acids are acetic, sulfuric, and phosphoric acids. Hypophosphorous acid is also used.

A disadvantage with neutralizing with an acid and leaving the salt in the polyether polyol or nonionic surfactant (the two terms are used interchangeably in the discussion which follows) composition arises where the salt is not soluble in the polyol. In such a case, the salt generated by the neutralization process will show up as a haze or precipitate. Precipitation of the salt in the product creates problems in storage tanks, filter pumps and lines. Further, the salt creates disposal problems and product loss by absorption. Even though most of the salt can be removed by bag filtration at the point of manufacture, crystallization is a slow process and so salts can crystallize and precipitate after shipment. This final crystallization of the salt in the polyether polyol fouls feed equipment resulting in equipment damage and loss of product flow to the process stream. Filtration and removal of the catalyst by the aforementioned magnesium silicate procedure is not cost effective since the filter cake has to be disposed of and there is product loss by absorption onto the magnesium silicate. The most cost-effective way therefore, is to neutralize the nonionic surfactants with an acid, which gives soluble salts, and to leave the salt in the nonionic surfactant.

The art has experimented with ways to neutralize non-ionic surfactant products by using different acids as neutralizing agents. U.S. Pat. No. 4,430,490 discloses the use of hydroxy carboxylic acids to form a clear reaction mixture without otherwise removing the alkaline catalyst. The polyether polyols are said to be useful for the production of polyurethane foams. U.S. Pat. No. 4,426,301 discloses the use of certain benzoic acid derivatives (such as e.g. salicylic acid) as a neutralizing agent for polyoxyalkylene surfactants (both monool and polyol) having greater than 50% ethylene oxide units. While these acids gave clear products, the hydroxy benzoic acids are solids and encounter process difficulties in their incorporation. Further, the neutralized polyoxyalkylene surfactants may generate a pink color when neutralized with hydroxy benzoic acids. Finally, the use of hydroxy carboxylic acids such as lactic acid introduces hydroxyl functionality into the neutralized polyether polyol. The increased hydroxyl functionality may lead to off spec material due to a too high hydroxyl number, or may interfere with applications of the polyols, as for example in polyurethanes when there is to be a subsequent reaction of hydroxyl groups on the polyol with isocyanate groups.

Applicants have now discovered that a class of branched aliphatic acids, which overcomes the disadvantages of the known acids discussed above, is useful for neutralizing polyether polyols. The salts of neutralization may be left in the polyether polyol product, sparing the expense of catalyst removal by absorption and/or filtration. The acids are generally liquids at room temperature, and are of low viscosity for ease of handling. They are relatively odor free and have a low order of toxicity. These acids give clear products with no settlement of salts when used to neutralize the alkaline catalyst after polymerization of alkylene oxides onto starter molecules. Essentially, the neutralized salts of these acids are soluble in the polyether polyol. Because there is no precipitate, there is no accumulation of crystallized salt, and equipment clean up is not required due to the accumulation of crystallized salt. Furthermore, the flow of the product to the process stream is not obstructed by the accumulated salt. Finally, the organic acids of the invention do not contribute to hydroxyl number of the final product, and do not interfere in subsequent reactions of the polyol.

SUMMARY OF THE INVENTION

Most generally, the invention provides a method for making a neutralized polyether polyol, comprising the steps of a) Polymerizing one or more alkylene oxides in the presence of an alkaline catalyst to form a polyalkylene oxide intermediate; and b) Neutralizing the intermediate, after the polymerization step a) is complete, with an organic acid of general formula

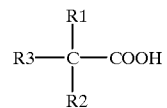

where R1 is hydrogen, methyl, or ethyl; R2 is methyl or ethyl; and R3 is an alkyl, aryl, or aralkyl group containing one to twelve carbon atoms.

The invention also comprises the novel compositions made by the above process.

DETAILED DESCRIPTION OF THE INVENTION

In one embodiment, the invention is a polyether polyol composition that is the reaction product of a polyoxyalkylene intermediate with a branched organic acid of general formula

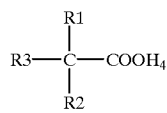

where R1 is hydrogen, methyl, or ethyl; R2 is methyl or ethyl; and R3 is an alkyl, aryl, or aralkyl group containing one to twelve carbon atoms.

Preferred organic acids include those where R1 and R2 are both methyl; where R1 and R2 are hydrogen and ethyl, respectively; and where R1 and R2 are methyl and ethyl, respectively. R3 is preferably an alkyl group, and more preferably an alkyl group with 1 to 8 carbons. Most preferably R3 is an alkyl group with 2 to 6 carbons.

Commercially available organic acids that fit into the above-preferred ranges are the most preferred for practicing the present invention. These include the neo acids of Exxon Chemical, as disclosed in the Exxon brochure "Neo Acids", dated February 1996. Examples are neoheptanoic acid, neooctanoic acid, neononanoic acid, and neodecanoic acid. Another commercially available organic acid useful in the present invention is 2-ethylhexanoic acid.

The preferred organic acids share the advantages of being normally liquid, of being available as 100% active materials, with no water present, and of being very mild in odor.

The polyoxyalkylene intermediate can be any polymeric molecule resulting generally from the polymerization of an alkylene oxide in the presence of an alkaline catalyst. The catalyst remains in the intermediate in its un-neutralized form. This un-neutralized form of the catalyst is usually represented as being present in the terminal alkoxide groups of the growing polyoxyalkylene chain. These terminal alkoxide groups are then to be neutralized by reacting them with the organic acids described above.

Most generally, the polyoxyalkylene intermediate is prepared by the reaction of an alkylene oxide or a mixture of alkylene oxides onto a starter molecule or a mixture of starter molecules having active hydrogens, in the presence of a base catalyst.

The alkylene oxides useful in the invention are generally oxirane or alkyl-, aryl-, or aralkyl-substituted oxiranes. In the substituted oxiranes, the alkyl, aryl, or aralkyl groups can contain from one to about 20 or more carbons. Examples include ethylene oxide, propylene oxide, 1,2-butylene oxide, 2,3-butylene oxide, isobutylene oxide, styrene oxide, and methylstyrene oxide, as well as oxiranes containing higher alkyl groups such as hexyl, octyl, decyl, dodecyl, hexadecyl, and octadecyl. Mixtures of alkylene oxides can be used, depending on the properties desired for the end use application of the compositions of the invention.

The most commonly used alkylene oxides are ethylene oxide, propylene oxide, and the butylene oxide isomers; thus, they are preferred in the invention. The most preferred alkylene oxides are ethylene oxide, propylene oxide, and 1,2-butylene oxide.

The starter molecules have active hydrogens which will react with the basic catalyst and the alkylene oxides to undergo polymerization. Examples of active hydrogens, which are well known in the art, include the hydrogen on functional groups such as —OH, —NHR, —SH, —COOH, and —C(O)NHR, where R is hydrogen, alkyl, aryl, or aralkyl. Thus, suitable starter molecules include alcohols, amines, mercaptans, carboxylic acids, and carboxylic amides, or mixtures thereof.

Suitable alcohols or mixtures of alcohols can be either monomeric or polymeric, and can be monofunctional or polyfunctional. Monomeric alcohols include mono-alcohols, diols, triols, and higher functional alcohols, and may be aliphatic or aromatic. Non-limiting examples include mono-alcohols such as methanol, ethanol, phenol, octylphenol, nonylphenol, decyl alcohol, dodecyl alcohol, stearyl alcohol, and oleyl alcohol; diols such as ethylene glycol, propylene glycol, 1,3-propanediol, neopentylglycol, 1,2-butanediol, and 1,4-butanediol; triols such as glycerol, trimethylolethane, and trimethylolpropane; tetrols such as ditrimethylolpropane and pentaerythritol; and higher functional alcohols such as sorbitol, glucose, fructose, and sucrose. Other suitable alcohols are those which also contain an amino group. Examples are triethanolamine, N,N-dialkylalkanolamines, and tripropanolamine.

Polymeric alcohols are also useful in the present invention. Polymeric alcohols are polymers that have hydroxy functionality. The most commonly used polymeric alcohols are the oligomers and polymers of ethylene oxide and propylene oxide. Oligomers include diethylene glycol, triethylene glycol, tetraethylene glycol, dipropylene glycol, and tripropylene glycol. Polymers include polyethylene glycol and polypropylene glycol. Other polymeric alcohols would include any polyether polyol made by polymerization of an alkylene oxide or mixture of alkylene oxides onto a starter molecule. That is, any polyether polyol, including those of this invention, may be used anew as a starter molecule in a subsequent base catalyzed polymerization reaction to form a polyoxyalkylene intermediate to be neutralized with an organic acid as described above.

Amines and alkylamines may also be used as starter molecules. They may be monoamines, diamines, triamines, higher functional amines, or mixtures thereof. They may be aliphatic or aromatic or a mixture of both. Examples include ethylamine, aniline, dodecyl amine, decyl amine, oleyl amine, isopropyl amine, ethylene diamine, toluene diamine, propane diamine, diethylene triamine, and triethylene tetramine.

Starter molecules may have both —OH and —NHR groups. Examples include alkanolamines such as N-isopropylethanolamine, propanolamine, and dipropanolamine.

Useful carboxy functional starter molecules include molecules with the general formula X —R—COOH, where R is an alkyl or alkenyl group having about 8 to 20 carbon atoms, and X is either a hydrogen (in which case the starter molecule is a monocarboxylic acid) or a carboxyl group (in which case the starter molecule is a dicarboxylic acid). Examples include decanoic acid, dodecanoic acid, oleic acid, stearic acid, palmitic acid, adipic acid, dodecanedioic acid, decanedioic acid, hexadecanedioic acid, and the like, including mixtures thereof.

N-alkyl fatty amides may also be used as starter molecules. In this case they have the general formula R—C(O)NHR', where R is an alkyl group having 8 to 20 carbon atoms and where R' is hydrogen or an alkyl, aryl, hydroxyalkyl, or aralkyl group having 2 to 20 carbon atoms. Examples are the fatty acid ethanolamides, which have both a —OH and a —C(O)NHR' functionality.

The alkaline polymerization catalysts useful in the invention are the conventional base catalysts for alkylene oxide polymerization. Both organic and inorganic catalysts can be used. Conventional organic catalysts for the preparation of polyoxyalkylenes are alkali metal alkylates having from 1 to 4 carbon atoms in the alkyl radical, such as sodium and potassium methylate, sodium and potassium ethylate, potassium isopropylate and sodium butylate or mixtures thereof. Inorganic catalysts such as alkali metal hydroxides and alkaline earth metal hydroxides can be used. These include sodium hydroxide, potassium hydroxide, cesium hydroxide, calcium hydroxide, barium hydroxide, and strontium hydroxide. Of these, sodium hydroxide and potassium hydroxide are more preferred, and potassium hydroxide is the most preferred.

The original starting proportion of the catalyst can be about 0.002 to about 10.0 percent by weight, preferably from 0.01 to 5.0 percent by weight and most preferably about 0.01 to about 1.5 percent by weight, all based upon the total weight of the final product. As is conventional, higher proportions of catalyst and low reaction temperatures are used where high molecular weight polyoxyalkylenes are desired. Conversely, where low molecular weight polyoxyalkylenes are desired, low catalyst proportions are utilized at moderate to high polymerization temperatures. As polymerization progresses, the catalyst is diluted by the addition of alkylene oxide so that the percent by weight of the catalyst in the reaction vessel becomes as little as ½ to ⅒ of the original percent catalyst level.

The polyoxyalkylene intermediate of the invention is prepared by polymerizing alkylene oxides onto a starter molecule in the presence of the alkaline catalyst. The alkylene oxide or mixture of alkylene oxides can be added in any order, and can be added in any number of polyoxyalkylene blocks. To make a block polyoxyalkylene intermediate, a first charge of alkylene oxide is added to a starter molecule in a reaction vessel. After the first charge, a second charge can be added and the reaction can go to completion. Where the first charge and the second charge have different relative compositions of alkylene oxides, there is produced a block polyoxyalkylene intermediate. It is preferred to make block polyols in this fashion where the blocks thus formed are either all ethylene oxide or all propylene oxide or all butylene oxide, but intermediate compositions are also possible. The blocks can be added in any order, and there can be any number of blocks. For example, one can add a first block of ethylene oxide, followed by a second block of propylene oxide. Alternatively, a first block of propylene oxide may be added, followed by a block of ethylene oxide. Third and subsequent blocks may also be added. The composition of all the blocks is to be chosen so as to give the final material the properties required for its intended application.

When the polyoxyalkylene intermediate is a block copolymer as described in the preceding paragraph, the polyether polyol of the invention is a so-called nonionic surfactant. Nonionic surfactants of this invention are useful as surfactants, dispersants, and in other applications in similar ways as are nonionic surfactants made by prior art methods. One useful set of nonionic surfactants produced according to this invention is the block ethylene oxide/propylene oxide copolymers. A well known member is the triblock nonionic surfactants, represented as A—B—A, where B is a block of polypropylene oxide and A is a block of polyethylene oxide; alternatively, B can be polyethylene oxide while A is polypropylene oxide. Commercial examples of the triblock nonionic surfactants are the Pluronic® and Pluronic R® surfactants of BASF Corporation. In the triblock surfactants, the propylene oxide content of the triblock can range from about 10% to about 90%, with the ethylene oxide comprising the rest.

Another commercial example of the triblock nonionic surfactants is the Tetronic® and Tetronic R® surfactants of BASF Corporation. Here, the starter molecule is ethylene diamine. In the Tetronic® surfactants, a first block of all propylene oxide is added, followed by a second block of all ethylene oxide. In the Tetronic R® surfactant, a first block of all ethylene oxide is added, followed by a second block of all propylene oxide.

Other nonionic surfactants are produced by the method of the invention when the starter molecules contain a hydrophobic group. The hydrophobic group usually consists of a long carbon chain, where the chain has at least about 4 carbons. The most commonly used starters of this type for making nonionic surfactants are the monofunctional alcohols, amines, carboxylic acids, carboxylic amides, or alkyl phenols. Thus, they can be represented by the simple general formula R—X, where R is an alkyl, alkenyl, or aralkyl group containing about 4 to 30 carbons, more preferably 4 to 24 carbons, and most preferably 6 to 18 carbons; and X is —OH, —NHR', —COOH, or —C(O)NHR', where R' is hydrogen or an alkyl, aryl, hydroxyalkyl, or aralkyl group having 2 to 20 carbon atoms.

Nonionic surfactants are made from these starters by polymerizing ethylene oxide onto them in the presence of an alkaline catalyst. The ethylene oxide block then serves as the hydrophilic portion of the surfactant, while the long carbon chain of the starter molecule serves as the hydrophobic portion. Optionally, other alkylene oxide blocks may be added prior to or subsequent to the ethylene oxide block, in order to tailor the properties of the nonionic surfactants to the requirements of the intended application. In addition, the alkylene oxide composition of the blocks may be varied in order to achieve the desired properties. Thus, in the example above, the 'ethylene oxide block' may in fact contain some propylene oxide, butylene oxide, or other alkylene oxides such as are described above.

But as is clear from the above discussion, the compositions and methods of the present invention are not limited to nonionic surfactants and producing nonionic surfactants. Where there are no alkylene oxide blocks in the final product, and where the starter molecule does not contain a long hydrophobic carbon chain, then the final product will not as a rule possess surfactant properties, but will nevertheless be the product of the present invention. These non-surfactant polyether polyols find wide application, for example as urethane polyols, in health and personal care, or as synthetic lubricants. Examples include the polyols made by adding propylene oxide to glycerol, trimethylolpropane, toluene diamine, ethanolamine, pentaerythritol, sucrose, sorbitol, or mixtures of them. Other simple examples of non-surfactants of the present invention include polyethylene glycol and polypropylene glycol.

In addition to the novel polyether polyol compositions of the invention described above, the invention also relates to a method for the manufacture of the novel compositions. Most generally, the invention provides a method for making a neutralized polyether polyol, comprising the steps of a) Polymerizing one or more alkylene oxides in the presence of an alkaline catalyst to form a polyalkylene oxide intermediate; and b) Neutralizing the intermediate, after the polymerization step a) is complete, with an organic acid of general formula

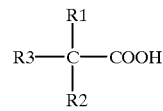

where R1 is hydrogen, methyl, or ethyl; R2 is methyl or ethyl; and R3 is an alkyl, aryl, or aralkyl group containing one to twelve carbon atoms.

Preferred organic acids are described above in the section on the novel compositions of the invention. The alkaline catalyst and the alkylene oxides useful in step a) are also described above.

Step a) can be accomplished in a number of ways. Typically, a starter molecule, as described above, is charged into a reaction vessel. Next, a catalytically effective amount of an alkaline catalyst is charged to the reaction vessel. The order of addition is not critical. The two ingredients can be stirred together for a time under heating to accomplish the reaction of the catalyst with the starter molecule. Thereafter, a charge of alkylene oxide is added and allowed to react. Optionally thereafter, subsequent charges of alkylene oxide can be added. Where the fractional alkylene oxide compositions of the first and the optional subsequent blocks differ from or among one another, there are produced block polymers, as discussed above. In particular, the first block may be polyethylene oxide and the second block may be polypropylene oxide. Alternatively, the first block may be polypropylene oxide and the second polyethylene oxide.

In a further alternative, useful nonionic surfactants according to the invention can be made by adding three blocks of alkylene oxides to a starter molecule or mixture of starter molecules. For example, the first block may consist essentially of all propylene oxide, the second of essentially all ethylene oxide, and the third block of essentially all propylene oxide. These surfactants are especially useful when the starter molecule contains a hydrophobic group, as described above.

The polyoxyalkylene intermediate formed in step a) above is subsequently reacted with the organic acid described above. The organic acid essentially reacts with the alkaline catalyst-containing polyoxyalkylene intermediate to neutralize it. It is thus preferable to add an amount of acid up to the stoichiometric amount necessary to neutralize the added alkaline catalyst. Alternatively, an amount of organic acid is added which is sufficient to bring the pH down to within the desired range. As an example, for some applications, it may be desirable to bring the pH down to 7, so that an essentially neutral product is obtained. An excess of the neutralizing organic acid may be added, but an excess is not necessarily required, and may in fact be undesirable in as much as the excess would add to the cost of the compositions of the invention.

The pH of the compositions of the invention is measured on a 2.5% weight solution of the polyether polyol in a 50:50 by weight mixture of methanol and water.

The result of neutralization will be to lower the pH of compositions of this invention. The pH is preferably brought down through addition of the organic acid to such a level that the polyether polyol thus formed will be useable in its intended application. Sometimes a partially neutralized product will suffice, but it will often be desirable to neutralize essentially completely the alkaline catalyst. Where a partially neutralized product is desired, preferably the pH will be brought down to below 10, more preferably below 9. Where complete neutralization of the alkaline catalyst is desired, the pH will be brought down preferably to below 8. When an excess of neutralizing organic acid may be tolerated from both a cost and an application stand point, the pH may be brought down to as low as about 5.

The novel compositions of the invention, and the novel method for their manufacture, are illustrated by the examples that follow.

The Method of the Present Invention

EXAMPLE 1

Regular Block Monool Polyoxyalkylene

A regular block monool polyoxyalkylene surfactant is prepared by adding 228.5 grams of a $C_{16}$–$C_{18}$ alcohol and 16.1 gram of a 45% weight aqueous solution of potassium hydroxide in a clean, dry, nitrogen-filled one-gallon autoclave equipped with temperature, pressure, and vacuum controls. The mixture is heated with agitation to 105° C. and then the autoclave is pressurized and purged with nitrogen. Water and volatiles are removed by stripping at 105° C. and 10 mm of pressure. The vacuum is then relieved with nitrogen. The mixture is then heated to 115° C. and the pressure is adjusted to up to 20 PSIG with nitrogen. Propylene oxide, 1639 g, is then added at a rate of 180 to 200 grams per hour while maintaining the temperature between 115–120° C. After all the propylene oxide is added, the reaction is continued for a period of 3 hours. The pressure is then adjusted with nitrogen to achieve a pressure of up to 40 PSIG. Ethylene oxide, 78.1 g, is then added over a period of 0.5 to 1 hour while maintaining the temperature between 115–120° C. When the reaction is complete, the autoclave is vented and vacuum is applied to 10 mm of pressure at 15° C. for 1 hour to remove the volatiles. The vacuum is then relieved with nitrogen, and the product is cooled.

EXAMPLE 1a.

A 50 g aliquot of a product made according to the procedure in Example 1 is neutralized to a pH of 7.1 by adding 0.89 g of neodecanoic acid. A clear product with no precipitation or cloudiness is obtained.

EXAMPLE 1b.

A 50 g aliquot of a product made according to the procedure of Example 1 is neutralized to a pH of 6.21 by adding 0.93 g of 2-ethyihexanoic acid. A clear product with no precipitation or cloudiness is obtained.

EXAMPLE 2

Regular Block Polyoxyalkylene

This is an example where the starter molecule is polymeric.

A regular block polyoxyalkylene surfactant is prepared by adding 557.7 grams of a polypropylene glycol of molecular weight 402 and 11.3 gram of 90% potassium hydroxide, to a clean, dry, nitrogen-filled one-gallon autoclave equipped with temperature, pressure, and vacuum controls. The mixture is heated with agitation to 125° C. and then the autoclave is pressurized and purged with nitrogen. The water is then stripped out by evacuating the mixture to 10 mm of mercury and heating at 125° C. The mixture is then heated to 140° C. and the pressure is adjusted to up to 20 PSIG with nitrogen. Propylene oxide, 1966 g, is then added at a rate of 340–350 grams per hour while maintaining the temperature at 140° C. After all the propylene oxide is added, the reaction is continued for 2–3 hours. The pressure is then adjusted with nitrogen to achieve a pressure of up to 40 PSIG. Ethylene oxide, 390 g, is then added over a period of 1 hour while maintaining the temperature at 140° C. When the reaction is complete, the autoclave is vented and vacuum is applied to 10 mm of pressure at 105° C. for 1 hour to remove the volatiles. The vacuum is then relieved with nitrogen, and the product is cooled .

EXAMPLE 2a.

A 50 g aliquot of a product made according to the procedure of Example 2 is neutralized to a pH of 7.1 by adding neodecanoic acid. A clear product with no precipitation or cloudiness is obtained.

EXAMPLE 2b.

A 50 g aliquot of a product made according to the procedure of Example 2 is neutralized to a pH of 6.4 by adding neoheptanoic acid. A clear product with no precipitation or cloudiness is obtained.

EXAMPLE 3

Reverse Block Polyoxyalkylene

This is another example where the starter molecule is polymeric. A reverse block polyoxyalkylene surfactant is prepared by adding 257 grams of a polyethylene glycol of molecular weight 300 and 10.2 gram of 90% potassium hydroxide, in a clean dry nitrogen-filled one-gallon autoclave equipped with temperature, pressure, and vacuum controls. The mixture is heated with agitation to 125° C. and then the autoclave is pressurized and purged with nitrogen. The mixture is then heated to 135° C. and the pressure is adjusted with nitrogen to achieve a pressure of up to 40 PSIG. Ethylene oxide, 480 g, is then added over a period of 1.5 hours while maintaining the temperature at 135° C. After all the ethylene oxide is added, reaction is continued for 0.5–1 hour. The autoclave is then cooled to 115° C., and the pressure is adjusted to up to 20 PSIG with nitrogen. Propylene oxide, 2257 g, is then added over a period of 6 hours while maintaining the temperature at 115° C. After all the propylene oxide is in, the reaction is continued for 3–4 hours. When the reaction is complete, the autoclave is vented and vacuum is applied to 10 mm of pressure at 105° C. for 1 hour to remove the volatiles. The vacuum is then relieved with nitrogen, and the product is cooled.

EXAMPLE 3a.

A 50 g aliquot of a product made according to the procedure of Example 3 is neutralized to a pH of 7.12 by adding neodecanoic acid. A clear product with no precipitation or cloudiness is obtained.

EXAMPLE 3b.

A 50 g aliquot of a product made according to the procedure of Example 3 is neutralized to a pH of 6.95 by adding neoheptanoic acid. A clear product with no precipitation or cloudiness is obtained.

EXAMPLE 4

Reverse Monoalcohol Polyoxyalkylene

A reverse monoalcohol polyoxyalkylene surfactant is prepared by adding 824.8 grams of a $C_{16}$–$C_{18}$ alcohol and 12.4 gram of a 45% weight aqueous solution of potassium hydroxide in a clean, dry, nitrogen-filled one-gallon autoclave equipped with temperature, pressure, and vacuum controls. The mixture is heated with agitation to 105° C. and then the autoclave is pressurized and purged with nitrogen. Water and volatiles are removed by stripping at 105° C. and 10 mm of pressure. The vacuum is then relieved with nitrogen. The mixture is then heated to 140° C. and the pressure is adjusted to with nitrogen to a pressure up to 40 PSIG. Ethylene oxide, 618.6 g, is then added over a period of 1 hour while maintaining the temperature between 135–140° C.. After all the ethylene oxide is added, the reaction is continued for 1 hour. When the reaction is complete, the autoclave is adjusted with nitrogen to a pressure up to 20 PSIG and cooled to 126° C. Propylene oxide, 1552.8 g, is then added over a period of 6 hours at a rate of 255–265 grams per hour. After all the propylene oxide is in, the reaction is continued an additional 3 hours. When the reaction is complete, the autoclave is cooled to 91° C., and vacuum is applied to 10 mm of pressure for 15 minutes to remove the volatiles. The vacuum is then relieved with nitrogen, and the product is cooled.

EXAMPLE 4a.

A 50 g aliquot of a product made according to the procedure of Example 4 is neutralized to a pH of 7.1 by adding neoheptanoic acid. A clear product with no precipitation or cloudiness is obtained.

What is claimed is:

1. A polyether polyol composition, comprising the reaction product of a polyoxyalkylene intermediate containing un-neutralized alkaline catalyst with an organic acid of general formula

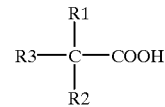

where R1 is hydrogen, methyl, or ethyl; R2 is methyl or ethyl; and R3 is an alkyl, aryl, or aralkyl group containing one to twelve carbon atoms,
wherein the polyoxyalkylene intermediate comprises an un-neutralized alkaline catalyst and the polymeric addition product of ethylene oxide or a mixture of ethylene oxide and other alkylene oxides onto a starter molecule or a mixture of starter molecules having active hydrogens.

2. The composition of claim 1, wherein the organic acid comprises neoheptanoic acid.

3. The composition of claim 1, wherein the organic acid comprises 2-ethylhexanoic acid.

4. The composition of claim 1, wherein R3 is an alkyl group having from 2 to 6 carbons.

5. The composition of claim 1, wherein the polyoxyalkylene intermediate is prepared from a process which comprises the steps of
   a) charging into a reaction vessel a starter molecule or a mixture of starter molecules having active hydrogen atoms;
   b) prior to, simultaneous with, or subsequent to step a), charging a catalytically effective amount of an alkaline polymerization catalyst;
   c) adding a first charge of an alkylene oxide or a mixture of alkylene oxides having a first fractional oxide composition; and
   d) optionally thereafter adding a second charge of an alkylene oxide or mixture of alkylene oxides having a second fractional oxide composition;
   wherein the first and second fractional oxide compositions differ from one another, and wherein either the first charge or the optional second charge comprises ethylene oxide.

6. The composition of claim 5, wherein the process further comprises e) after step d), adding a third charge of an alkylene oxide or a mixture of alkylene oxides having a third fractional oxide composition,
   wherein the third and second fractional oxide compositions differ from one another.

7. The composition of claim 1, wherein the starter molecule having active hydrogen atoms is monomeric or polymeric, and contains one or more functional groups selected from the group consisting of —NHR, —SH, —COOH, and —C(O)NHR, where R is hydrogen, alkyl, aryl, hydroxyalkyl, or aralkyl, and wherein the organic acid comprises 2-ethylhexanoic acid or neoheptanoic acid.

8. The composition of claim 1, wherein the alkaline catalyst is selected from the group consisting of alkali metal hydroxides, alkaline earth hydroxides, and alkali metal alkylates, and wherein the organic acid comprises 2-ethylhexanoic acid or neoheptanoic acid.

9. The composition of claim 5, wherein the first charge of alkylene oxide comprises ethylene oxide and the second charge of alkylene oxide comprises propylene oxide.

10. The composition of claim 5, wherein the first charge of alkylene oxide comprises propylene oxide and the second charge of alkylene oxide comprises ethylene oxide..

11. The composition of claim 6, wherein the first charge of alkylene oxides consists essentially of propylene oxide, the second charge of alkylene oxides consists essentially of ethylene oxide, and the third charge of alkylene oxides consists essentially of propylene oxide.

12. A method for making a neutralized polyether polyol, comprising the steps of
   a) polymerizing one or more alkylene oxides in the presence of an alkaline catalyst to form a polyalkylene oxide intermediate; and
   b) neutralizing the intermediate, after the polymerization step a) is complete, with an organic acid selected from the group consisting of neoheptanoic acid, 2-ethylhexanoic acid, and neononanoic acid.

13. The method of claim 12, wherein the polymerizing step a) comprises the steps of
   a1) charging into a reaction vessel a starter molecule or a mixture of starter molecules having active hydrogen atoms;
   a2) prior to, simultaneous with, or subsequent to step a1), charging a catalytically effective amount of an alkaline polymerization catalyst;
   a3) adding a first charge of an alkylene oxide or a mixture of alkylene oxides having a first fractional oxide composition; and
   a4) optionally thereafter adding a second charge of an alkylene oxide or a mixture of alkylene oxides having a second fractional oxide composition;
   wherein the first and second fractional oxide compositions differ from one another.

14. The method of claim 13, wherein the polymerizing step a) further comprises a5) after step a4), adding a third charge of an alkylene oxide or mixture of alkylene oxides having a third fractional oxide composition,
   wherein the third and second fractional oxide compositions differ from one another.

15. The method of claim 13, wherein the starter molecule having active hydrogen atoms is monomeric or polymeric, and contains one or more functional groups selected from the group consisting of —NHR, —SH, —COOH, and —C(O)NHR, where R is hydrogen, alkyl, aryl, hydroxyalkyl, or aralkyl.

16. The method of claim 13, wherein the alkaline polymerization catalyst is selected from the group consisting of alkali metal hydroxides, alkaline earth hydroxides, and alkali metal alkylates.

17. The method of claim 13, wherein the first charge of alkylene oxide comprises ethylene oxide and the second charge of alkylene oxide comprises propylene oxide.

18. The method of claim 13, wherein the first charge of alkylene oxide comprises propylene oxide and the second charge of alkylene oxide comprises ethylene oxide.

19. The method of claim 14, wherein the first charge of alkylene oxides consists essentially of propylene oxide, the second charge of alkylene oxides consists essentially of ethylene oxide, and the third charge of alkylene oxides consists essentially of propylene oxide.

20. A polyether polyol composition, prepared by a process comprising the steps of
   a) polymerizing one or more alkylene oxides in the presence of an alkaline catalyst to form a polyalkylene oxide intermediate; and
   b) neutralizing the intermediate, after the polymerization step a) is complete, with an organic acid selected from the group consisting of neoheptanoic acid and 2-ethylhexanoic acid.

21. The composition of claim 20, wherein the alkaline polymerization catalyst is selected from the group consisting of alkali metal hydroxides, alkaline earth hydroxides, and alkali metal alkylates.

22. The composition of claim 20, where the alkylene oxides are selected from the group consisting of ethylene oxide, propylene oxide, and butylene oxide.

* * * * *